3,174,979
CARBOXYLIC ACID ESTERS OF N-(HYDROXY-ALKYL)-ENDO PERHYDRO - 4,7 - METHANOISO-INDOLES AND INTERMEDIATES
James W. Bolger, Canoga Park, Calif., assignor to Rexall Drug and Chemical Company, Los Angeles, Calif., a corporation of Delaware
No Drawing. Filed July 27, 1962, Ser. No. 213,051
11 Claims. (Cl. 260—319)

This invention relates to compositions of matter classified in the art of chemistry as substituted isoindoles, to a process for making such compositions and to intermediates obtained in the synthesis.

The invention sought to be patented, in its final product composition aspect, resides in the concept of a carboxylic acid ester of a chemical compound in which there is attached to the nitrogen atom of an endo-perhydro-4,7-methanoisoindole nucleus or its hereinafter disclosed equivalent, a hydroxy-lower-alkyl radical.

The invention sought to be patented, in a first intermediate composition aspect, also resides in the concept of a chemical compound in which there is attached to the nitrogen atom of an endo-bicyclo-[2,2,1]-heptane-2,3-dicarboximide nucleus or its hereinafter disclosed equivalent, a hydroxy-lower-alkyl group.

The invention sought to be patented, in a second intermediate composition aspect, also resides in the concept of a chemical compound in which there is attached to the nitrogen atom of an endo-1,3,3a,4,7,7a-hexahydro-4,7-methanoisoindole nucleus or its hereinafter disclosed equivalent a hydroxy-lower-alkyl group.

The invention sought to be patented, in a third intermediate composition aspect, also resides in the concept of a chemical compound in which there is attached to the nitrogen atom of an endo-perhydro-4,7-methanoisoindole nucleus or its hereinafter disclosed equivalent a hydroxy-lower-alkyl group.

The tangible embodiments of this invention, in its final product and intermediate composition aspects, possess the inherent general physical characteristics of being, in the form of their acid addition salts, white crystalline solids. Spectral data reveal, in the final product and first and third intermediate composition aspect, no unsaturation except as present in the benzene ring of the equivalent 7a-phenyl-substituted compound or in the benzene rings of phenyl substituted carboxylic acids used to form carboxylic acid esters. In the second intermediate composition aspect, spectral data reveal unsaturation to be present only in the benzene ring of the equivalent 7a-phenyl-substituted compound and between carbon atoms 5 and 6 in the hexahydro methanoisoindole nucleus. The aforementioned physical characteristics, taken together with the nature of the starting materials and the mode of synthesis positively confirm the structure of the compounds sought to be patented.

The tangible embodiments of this invention, in its final product composition aspect, possess the inherent applied use characteristics of having significant pharmacological activity as anti-Parkinson and anti-hypertensive agents as determined by recognized and accepted pharmacological test procedures.

The tangible embodiments of this invention, in its third intermediate composition aspect, also possess the inherent applied use characteristics of having pharmacological activity in prolonging the effect of pharmacologically active barbituric acid derivatives as determined by recognized and accepted pharmacological test procedures.

The tangible embodiments of this invention, in their intermediate composition aspects, possess the inherent applied use characteristics of being useful and valuable as chemical intermediates in the production of the tangible embodiments of this invention in their final product composition aspect, by reaction sequences to be described hereinafter, as well as being useful and valuable as chemical intermediates in the production of other pharmacologically active compositions of matter. For example, the N-hydroxyalkyl substituted isoindoles, which constitute the tangible embodiments of this invention in its third intermediate composition aspect, can be reacted with a thionyl halide to form the pharmacologically active N-halo-lower alkyl-endo-perhydro-4,7-methanoisoindoles which are described and claimed in my application entitled "N-(Haloalkyl)-Endo-Perhydro-4,7-Methanoisoindoles," Serial No. 213,050 filed July 27, 1962, now U.S. Patent 3,118,905 which issued on January 21, 1964.

The manner and process of making and using the invention will now be generally described so as to enable a person skilled in the art of chemistry to make and use the same as follows:

The starting material for the preparation of the tangible embodiments of this invention is the compound bicyclo-[2,2,1]-hept-5-ene-2,3 - endo - dicarboxylic anhydride, or its hereinafter disclosed equivalent which is readily prepared by the general technique described by Diels and Alder, Ann. 460:98 (1928), by reacting maleic anhydride with cyclopentadiene at room temperature in an inert solvent such as benzene.

The conversion of the starting material to the tangible embodiments of this invention is carried out by one of the synthetic pathways illustrated as follows where A is lower alkylene, $R_1$ is hydrogen or its hereinafter disclosed equivalent, and $R_2$ is the aliphatic or aromatic portion of the carboxylic acid used in the esterification.

As used throughout the specification and in the claims, the terms "lower alkyl," "lower alkylene" and "lower alkoxy" embrace straight and branched chain alkyl, alkylene and alkoxy radicals, respectively, containing 1 to 6 carbon atoms.

Starting materials bearing at the 2-position a lower alkyl or phenyl group, or such groups bearing one or more substituents such as lower alkoxy, halogen, trifluoromethyl, or lower alkyl in the case of phenyl, are the full equivalents of the above described bicyclo-[2,2,1]-hept-5-ene-2,3-endo-dicarboxylic anhydride in the foregoing reaction sequences and are either known compounds or can be prepared in the same manner as described herein by the reaction of cyclopentadiene with an appropriately substituted maleic anhydride. Each of these materials is useful for conducting the following reaction sequences thereby to produce substituted isoindole final products having the same utility as the substituted endo-perhydro-4,7-methanoisoindole finished product.

The initial step in the reaction sequence which leads from the starting material to the first and third intermediate composition aspect of this invention is the catalytic

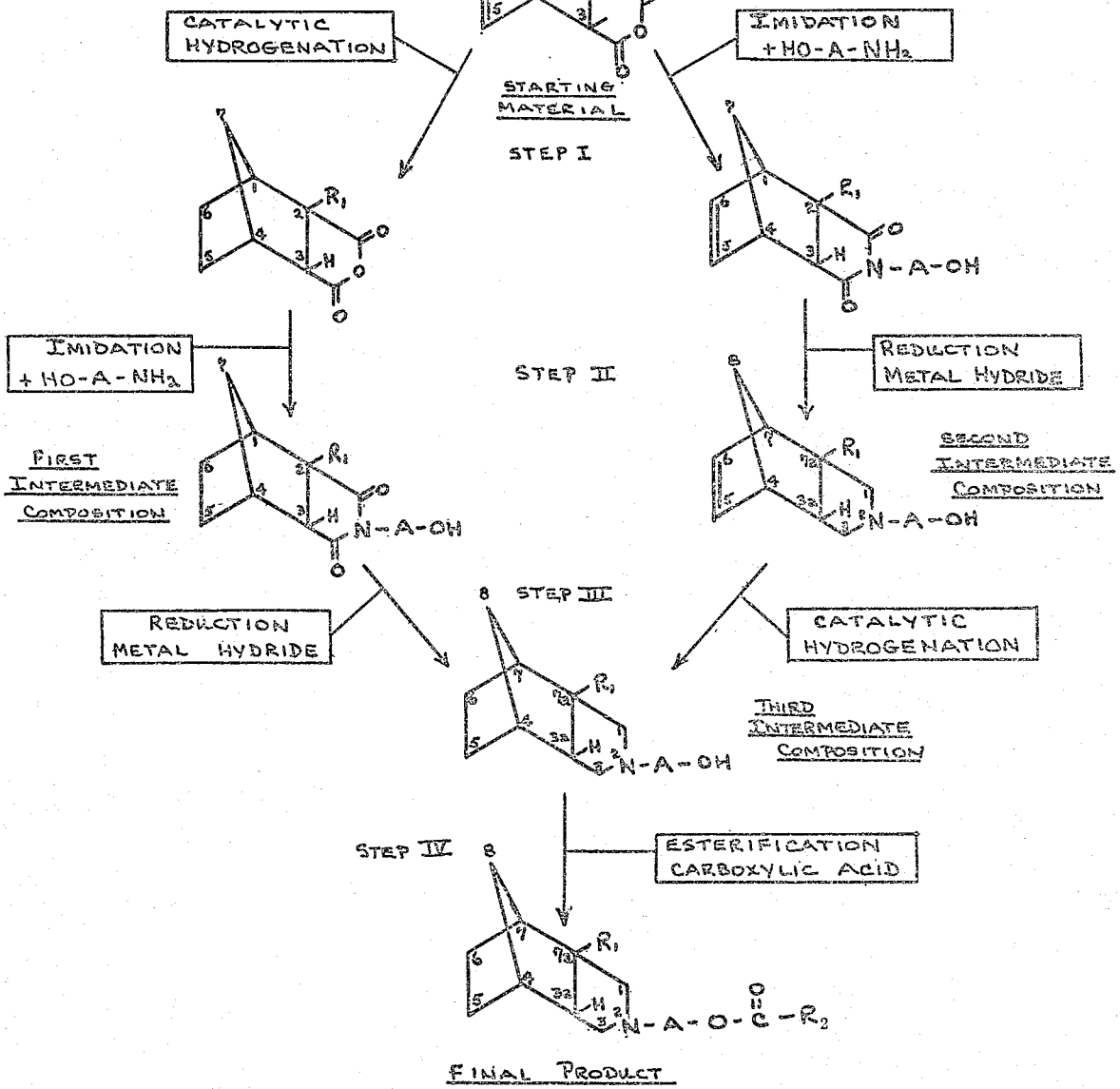

hydrogenation of the starting material to saturate the double bond between the 5 and 6 position of the bicyclo-[2,2,1]-heptene ring system. The starting material is dissolved in an inert solvent, such as tetrahydrofuran, and the hydrogenation is carried out in the presence of a noble-metal catalyst, for example platinum, palladium, rhodium, ruthenium and mixtures thereof, preferably on a suitable catalyst support such as carbon. Completion of the reaction is shown by the uptake of one mole of hydrogen per mole of starting material. With active catalyst, such as palladium on carbon, the hydrogenation may be carried out at room temperature to completion. With less active catalyst, for example, Raney nickel, heating of the reaction mixture to a temperature of not more than 100° C. may be necessary to carry the reaction to completion.

The second step in this reaction sequence is the conversion of the hydrogenated product to the tangible embodiments of this invention, in its first intermediate composition aspect, by replacing the ring oxygen atom of the saturated dicarboxylic anhydride structure with a nitrogen atom. The reaction is one of imidation and involves treatment of the dicarboxylic anhydride structure prepared as described above with a hydroxy-lower-alkylamine.

The reaction of endo-bicyclo-[2,2,1]-heptane-2,3-dicarboxylic anhydride or its 2-substituted equivalents with a hydroxy-lower-alkylamine is carried out by heating the reactants together at temperatures of from about 80° C. to about 200° C. The solid product obtained upon cooling the reaction mixture after completion of the reaction is purified by crystallization from organic solvents such as benzene and mixtures of tetrahydrofuran and chloroform.

As an alternate procedure, the reaction can be carried out by, first, treating the anhydride with a lower alkanol to open the anhydride ring and form a half methyl ester of the corresponding acid, and, second, treating the so-produced half-ester with a mixture of the imidating agent and methanol, thereby to produce the dicarboximide which constitutes the first intermediate composition aspect of this invention.

The third step in the reaction sequence is the conversion of the tangible embodiments of this invention, in its first intermediate composition aspect, to the tangible embodiments of this invention in its third intermediate composition aspect, by treatment of the dicarboximide with a metal hydride reducing agent, such as lithium aluminum hydride potassium borohydride, sodium borohydride either alone or mixed with aluminum chloride, and the like. The reaction is carried out under reflux in the presence of an inert oxygenated solvent such as tetrahydrofuran, ether and the like. Upon completion of the reaction, residual reducing agent is decomposed by the addition of aqueous alkali and the product is recovered from the solution by conventional techniques of crystallization.

The sequence of the reactions described above for obtaining the tangible embodiments of this invention in its third intermediate composition aspect may be changed so that the steps of "imidation" and reduction precede rather than follow the step of catalytic hydrogenation and such changed sequence is the full equivalent of the reaction sequence hereinabove described. Thus, imidation of the starting material results in the production of an unsaturated N-hydroxy-lower alkyl dicarboximide which, upon treatment with a metal hydride reducing agent, yields the substituted hexahydro-4,7-methanoisoindole which is the second intermediate composition aspect of this invention. Catalytic hydrogenation of the hexahydromethanoisoindole saturates the double bond and yields the perhydro-4,7-methanoisoindole which constitutes the third intermediate composition aspect of this invention.

The final step in the reaction sequence is the conversion of the tangible embodiments of this invention, in its third intermediate composition aspect, to the tangble embodiments of this invention, in its final product composition aspect, by a conventional esterification reaction. Treatment with a carboxylic acid, for example in aliphatic carboxylic acid such as acetic acid, propionic acid, butyric acid, caproic acid and the like or an aromatic carboxylic acid such as, for example, benzoic acid, phenylacetic acid, diphenylacetic acid, phenylpropionic acid, o-hydroxybenzoic acid, p-hydroxybenzoic acid, p-methylbenzoic acid, m-methylbenzoic acid and the like, either as the free acid or in the form of the acid halides, such as, for example, the acid chloride, the acid bromide and the acid fluoride, or in the form of the acid anhydride, in the presence of an inert organic solvent such as methylene chloride, benzene, chloroform, pyridine and the like effects the esterification. The reaction is carried out under slightly elevated temperature and the product is recovered by conventional techniques of precipitation, filtration and crystallization.

The tangible embodiments of this invention in both the third intermediate composition and final product composition aspects, can, if desired, be converted into their non-toxic pharmaceutically acceptable acid addition and quaternary ammonium salts by conventional procedures. Typical acid addition salts include the hydrochloride, hydrobromide, citrate, maleate, sulfate, nitrate and the like. Typical quaternary ammonium salts are those formed with such alkyl halides as methyl iodide, n-hexyl bromide and the like. Such salts are the full equivalent of the free bases and are included within the scope of this invention.

The tangible embodiments of this invention, in its third intermediate and final product composition aspects, either as the free bases or in the form of a non-toxic pharmaceutically acceptable acid addition or quaternary ammonium salt, can be combined with conventional pharmaceutical diluents and carriers, to form such dosage forms as tablets, capsules, solutions, suspensions, suppositories and the like.

The best mode contemplated by the inventor of carrying out this invention will now be set forth as follows:

EXAMPLE 1

(a) *Bicyclo-[2,2,1]-heptane-2-methyl-2,3-endo-dicarboxylic anhydride*

Bicyclo-[2,2,1]-hept-5-ene-2-methyl - 2,3 - endo - dicarboxylic anhydride (188 g., 1.06 moles) is dissolved in 500 ml. of ethyl acetate. 10% palladium on carbon catalyst is added and the mixture is hydrogenated for one hour at 40 p.s.i. and at room temperature (100% hydrogen uptake). The catalyst is removed by filtration and the filtrate is reduced in vacuo to a dry white solid. Yield: 184 g. (97%) of white crystals, M.P. 126–128° C.

(b) *N-(2'-hydroxyethyl)-bicyclo-[2,2,1]-heptane-2-methyl-2,3-endo-dicarboximide*

The anhydride formed in step "a" (174 g., 0.967 mole) is mixed with ethanolamine (59 g., 0.967 mole). The resulting mixture is heated at 180° C. for two hours allowing the water formed to distill from the reaction. The resulting melt is cooled and poured into petroleum-ether (30°–60° C. boiling range) and crystallization induced. Yield: 206 g. (95%) of white crystals, M.P. 62–63° C.

(c) *N-(2'-hydroxyethyl)-7a-methyl-endo-perhydro-4,7-methanoisoindole*

The hydroxyethyldicarboximide formed in step "b" (200 g., 0.896 mole) is dissolved in tetrahydrofuran (1100 ml.) and the solution is added dropwise to a solution of lithium aluminum hydride (85 g., 2.24 moles) in 1300 ml. of anhydrous ether. The reaction mixture is then stirred and refluxed for 21 hours. Then, while still stirring, the reaction is decomposed by the successive addition of 90 ml. of water, 68 ml. of 20% sodium hydroxide solution and 310 ml. of water. The mixture is stirred for one additional hour and the salts removed by filtration and washed with tetrahydrofuran. The combined filtrates are dried over magnesium sulfate. The solvent is then removed by evaporation and the residue is distilled in vacuo. Yield: 128 g. (73%); B.P. 120–125° C./3–5 mm. Hg.

*Analysis.*—Calculated for $C_{12}H_{21}NO$: C, 73.79%; H, 10.84%. Found: C, 74.04%; H, 10.53%.

(d) *Diphenylacetic acid ester of N-(2'-hydroxyethyl) 7a-methyl-endo-perhydro-4,7-methanoisoindole*

Diphenyl acetic acid (21.4 g., 0.101 mole) is dissolved in 200 ml. of methylene chloride. Thionyl chloride (12 ml., 0.161 mole) is added and the solution is stirred at room temperature for 20 hours. The solvent is removed by distillation leaving an oily residue which is washed with cold petroleum-ether (30°–60° C. boiling range) to remove excess thionyl chloride. The oil is then dissolved in hot petroleum ether (30°–60° C. boiling range) and cooled to induce crystallization. Yield: 20.3 g. (87%), M.P. 55–56° C., of diphenylacetyl chloride.

The diphenylacetyl chloride thus formed (11.8 g., 0.0513 mole) is dissolved in 100 ml. of methylene chloride. As this solution is stirred and refluxed, N-(2'-hydroxyethyl)-7a-methyl - endo - perhydro-4,7-methanoisoindole (10 g., 0.0513 mole) is added dropwise. The resulting solution is stirred and refluxed for 2.5 hours and then reduced to one-fifth its volume by distillation. Anhydrous ether is added to precipitate the product. A clear oil is obtained that is crystallized from ethanol/ether (anhydrous). Yield: 12 g. (55%) of white crystals, M.P. 92–94° C.

*Analysis.*—Calculated for $C_{26}H_{32}NO_2Cl$: C, 73.30%; H, 7.57%; Cl, 8.34%. Found: C, 73.0%; H, 7.6%; Cl, 8.06%.

The following examples illustrate the preparation of other tangible embodiments of this invention:

EXAMPLE 2

(a) *N-(2'-hydroxyethyl)-bicyclo-[2,2,1]-hept-5-ene-2,3-dicarboximide*

Bicyclo - [2,2,1]-hept-5-ene-2,3-dicarboxylic anhydride (164 g., 1 mole) is added to ethanolamine (492 g., 8.1 mole). The mixture is first heated on a steam bath until the solid anhydride is dissolved and the solution is then refluxed on a Wood's metal bath and the excess ethanolamine is distilled off over a period of three hours. The residue is distilled in vacuo. Yield: 100 g. (50%), B.P. 185–190° C./1 mm. Hg.

(b) *N-(2'-hydroxyethyl)-endo-1,3,3a,4,7,7a-hexahydro-4,7-methanoisoindole*

The imide formed in step "a" (103 g., 0.5 mole) is dissolved in 500 ml. of dry tetrahydrofuran and slowly added dropwise to a solution consisting of lithium aluminum hydride (50 g., 1.32 mole) dissolved in 1200 ml. of anhydrous ether. The mixture is refluxed and stirred for eight hours. Water (53 ml.), then aqueous 20% sodium hydroxide (40 ml.) and finally water (184 ml.) are added dropwise. The mixture is then stirred for an additional hour. The inorganic salts are removed by filtration and washed with tetrahydrofuran. The combined organic solution is dried with anhydrous magnesium sulfate. The solvent is removed by evaporation leaving a residue which is distilled in vacuo. Yield: 58 g. (65%), B.P. 104–106° C./1 mm. Hg.

(c) *N-(2'-hydroxyethyl)-endo-perhydro-4,7-methanoisoindole hydrochloride*

The substituted hexahydromethanoisoindole formed in step "b" (52 g., 0.0266 mole) is dissolved in 95% ethanol (200 ml.). One gram of platinum dioxide catalyst is added and the resulting mixture is hydrogenated at 35 p.s.i. and room temperature (91% hydrogen uptake is observed). The catalyst is removed by filtration and the ethanol by evaporation. The residue is distilled in vacuo. Yield: 48.5 g. (88%), B.P. 127–130° C/9 mm. Hg.

*Analysis.*—Calculated for $C_{11}H_{19}NO \cdot HCl$: C, 60.68%; H, 9.26%. Found: C, 60.80%; H, 8.98%. The hydrochloride converted from the amine has a M.P. of 138° C.

EXAMPLE 3

(a) *Bicyclo-[2,2,1]-heptane-2-phenyl-2,3-endo-dicarboxylic anhydride*

Phenylmaleic anhydride (49 g., 0.282 mole), is mixed with cyclopentadiene (19.0 g., 0.284 mole) and 250 ml. of benzene. The resulting solution is kept at 50° C. and under a nitrogen atmosphere for 24 hours. Then 3 g. of 10% palladium on carbon catalyst is added and the mixture hydrogenated at room temperature and at 40 p.s.i. (100% hydrogen uptake). The catalyst is removed by filtration and the solution reduced to an oil in vacuo. The oil is crystallized by adding petroleum-ether (30°–60° C. boiling range). The crude white crystals are recrystallized from methylene chloride and petroleum-ether (30°–60° C. boiling range). Yield: 58 g. (84%); M.P. 70–71° C.

(b) *N-(2'-hydroxyethyl)-bicyclo-[2,2,1]-heptane-2-phenyl-2,3-endo-dicarboximide*

The anhydride formed according to step "a" (50 g. 0.206 mole) is mixed with 2-aminoethanol (13 g., 0.214 mole). The mixture is heated at 170° C. for two hours. The water formed in the reaction is allowed to distill off during the heating period. The resulting cooled melt is poured into cyclohexane and crystallization induced. The crude white product is recrystallized from ethanol/water. Yield: 50 g. (80%), M.P. 144–145° C.

*Analysis.*—Calculated for $C_{17}H_{19}NO_3$: C, 71.56%; H, 6.71%; N, 4.91%. Found: C, 71.31%; H, 6.72%; N, 4.81%.

(c) *N-(2'-hydroxyethyl)-7a-phenyl-endo-perhydro-4,7-methanoisoindole hydrochloride*

A solution of the imide (40 g., 0.14 mole), formed as described in step "b," in 200 ml. of tetrahydrofuran is added dropwise to a stirred solution of lithium aluminum hydride (13.1 g., 0.336 mole) in 200 ml. of anhydrous ether. The reaction mixture is stirred and refluxed for 23 hours. The mixture is then cooled and, while stirring, 14.1 ml. of water is added dropwise, then 10.6 ml. of 20% sodium hydroxide solution and finally 48.2 ml. of water are added. The resulting mixture is stirred for an additional hour. The salts are removed by filtration and washed with tetrahydrofuran. After the combined filtrate and wash is dried over magnesium sulfate, the volume is reduced to approximately 100 ml. by evaporation. The product is obtained as white crystals by making the solution strongly acidic with gaseous hydrogen chloride and cooling. The crude product is recrystallized from ethanol/ether (anhydrous). Yield: 16.6 g. (40%), M.P. 182–183° C.

*Analysis.*—Calculated for $C_{17}H_{24}NOCl$: C, 69.49%; H, 8.24%; Cl, 12.07%. Found: C, 69.45%; H, 8.05%; Cl, 11.99%.

EXAMPLE 4

(a) *N-(3'-hydroxypropyl)-bicyclo-[2,2,1]-heptane-2,3-endo-dicarboximide*

Bicyclo-[2,2,1]-heptane-2,3-endo-dicarboxylic anhydride (200 g.) is prepared by the catalytic hydrogenation of bicyclo-[2,2,1]-hept-5-ene-2,3-endo-dicarboxylic anhydride by the technique described in Example 1 (a), is mixed with 235 g. methanol and the resulting solution is refluxed for 16 hours. The solution is then concentrated to about 300 ml. and then diluted with 150 g. (2.0 moles) of 3-aminopropanol. The excess methanol and aminopropanol is removed by distillation until the temperature reaches 190° C. The resulting imide is dissolved in chloroform, washed with dilute hydrochloric acid, dried over magnesium sulfate and then concentrated in vacuo. The resulting imide is used without further purification. Yield: 222 g.

(b) *N-(3'-hydroxypropyl)-endo-perhydro-4,7-methanoisoindole hydrochloride*

Lithium aluminum hydride (115 g., 3.03 mole) is dissolved in 500 ml. of anhydrous ether. To this solution is added the 222 g. (0.998 mole) of the imide, formed in step "a," dissolved in 300 ml. of tetrahydrofuran. The reaction mixture is then refluxed for twenty hours. The mixture is cooled and then to it is added dropwise water, 20% sodium hydroxide solution and finally water. This mixture is stirred for an additional hour, the salts are removed by filtration and washed with tetrahydrofuran. The filtrate and wash are dried over magnesium sulfate and reduced in volume by distillation. The resulting solution is made acidic with gaseous hydrogen chloride and with cooling white crystals are obtained. The crude hydrochloride salt is recrystallized from ethanol/ether (anhydrous). Yield: 146 g., M.P. 115–116° C.

*Analysis.*—Calculated for $C_{12}H_{22}ONCl$ (MW 231): C, 62.4%; H, 9.5%; N, 6.1%. Found: C, 62.4%; H, 9.6%; N, 6.3%.

EXAMPLE 5

(a) *N-(2'hydroxypropyl)-bicyclo-[2,2,1]-heptane-2,3-endo-dicarboximide*

Bicyclo-[2,2,1]-heptane-2,3-endo-dicarboxylic anhydride (66.5 g., 0.4 mole) and 1-methylethanolamine (30 g., 0.4 mole) are mixed together and the mixture is heated at 170° C. for two hours. During the heating, the water formed is distilled off. The melt is cooled and poured into petroleum ether (30°–60° C. boiling range). By scratching, white crystals are obtained. The crude product is recrystallized from methylene chloride/petroleum ether (30°–60° C. boiling range). Yield: 73 g. (82%), M.P. 109–110° C.

*Analysis.*—Calculated for $C_{12}H_{17}NO_3$: C, 64.55%; H, 7.67%; N, 6.27%. Found: C, 65.03%; H, 7.12%; N, 6.81%.

(b) *N-(2'-hydroxypropyl)-endo-perhydro-4,7-methanoisoindole hydrochloride*

A solution of the imide (65 g., 0.292 mole), formed in step "a," in 400 ml. of tetrahydrofuran is added dropwise with stirring to a solution of lithium aluminum hydride (27.7 g., 0.73 mole) in 400 ml. of anhydrous ether. The reaction mixture is then refluxed for twenty hours. The mixture is cooled and 29.7 ml. water is added dropwise, then 22.3 ml. of 20% sodium hydroxide solution and finally 102 ml. of water is added. The mixture is then stirred for an additional hour. The salts are removed by filtration and washed with tetrahydrofuran. The filtrate and wash are dried over magnesium sulfate and reduced in volume by distillation to approximately 200 ml. The resulting solution is made acidic with gaseous hydrogen chloride and by cooling white crystals are obtained. The crude product is recrystallized from ethanol ether (anhydrous). Yield: 45.5 g. (67%), M.P. 201–202° C.

*Analysis.*—Calculated for $C_{12}H_{22}NOCl$: C, 62.18%; H, 1.57%; Cl, 15.30%. Found: C, 62.02%; H, 9.56%; Cl, 15.34%.

EXAMPLE 6

(a) *N-(2'-hydroxy-1'-methylethyl)-bicyclo-[2,2,1]-heptane-2,3-endo-dicarboximide*

Bicyclo - [2,2,1] - heptane - 2,3-endo-dicarboxylic anhydride (66.5 g., 0.4 mole) is mixed with 2-amino-1-propanol (30 g., 0.4 mole). The mixture is then heated at 170° C. for two hours. During the heating period the water formed is allowed to distill off. The dark melt is cooled and poured into petroleum ether (30°–60° C. boiling range). By scratching the insoluble oil, light brown crystals are obtained. Yield: 73 g.

(b) *N-(2'-hydroxy-1'-methylethyl)-endo-perhydro-4,7-methanoisoindole hydrochloride*

A solution of the imide (60 g., 0.269 mole), prepared in step "a," in 400 ml. of tetrahydrofuran is added dropwise to a stirred solution of lithium aluminum hydride (25.6 g., 0.646 mole) in 400 ml. of anhydrous ether. The reaction mixture is then refluxed for 20 hours. The reaction mixture is cooled and 27.4 ml. of water is added dropwise, then 20.6 ml. of 20% sodium hydroxide solution and finally 94.2 ml. of water is added. The mixture is then stirred for an additional hour. The salts are removed by filtration and washed with tetrahydrofuran. The combined filtrates are dried over magnesium sulfate and reduced in volume to about 100 ml. The resulting solution is made acidic to Congo red indicator with gaseous hydrogen chloride. After cooling, the product is obtained as white crystals. The crude product is recrystallized from ethanol/ether (anhydrous). Yield: 22.8 g. (37%), M.P. 153–154° C.

It will be understood that the N-hydroxy-lower alkyl-endo-perhydro-4,7-methanoisoindoles prepared as described in the foregoing examples can be treated in accordance with conventional techniques of esterification, with carboxylic acids, anhydrides or acid halides, to form the esters which constitute the tangible embodiments of this invention in its final product composition aspect.

The subject matter which the applicant regards as his invention is particularly pointed out and distinctly claimed as follows:

1. N - (2' - hydroxyethyl) - endo - 1,3,3a,4,7,7a - hexahydro-4,7-methanoisoindole.

2. N - (2' - hydroxyethyl) - endo - perhydro - 4,7-methanoisoindole.

3. N - (3' - hydroxypropyl) - endo - perhydro - 4,7-methanoisoindole.

4. N - (2' - hydroxy - 1' - methylethyl) - endo - perhydro-4,7-methanoisoindole.

5. N - (2' - hydroxyethyl) - 7a - methyl - endo - perhydro-4,7-methanoisoindole.

6. N - (2' - hydroxyethyl) - 7a - phenyl - endo - perhydro-4,7-methanoisoindole.

7. N - (2' - hydroxypropyl) - endo - perhydro - 4,7-methanoisoindole.

8. The diphenylacetic acid ester of N-(2'-hydroxyethyl)-7a-methyl-endo-perhydro-4,7-methanoisoindole.

9. A compound of the formula

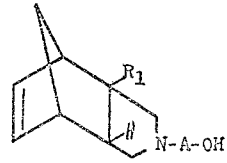

where A is lower alkylene and $R_1$ is a member selected from the group consisting of hydrogen, lower alkyl and phenyl.

10. A compound of the formula

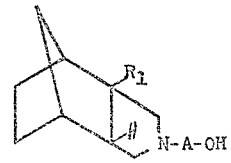

where A is lower alkylene and $R_1$ is a member selected from the group consisting of hydrogen, lower alkyl and phenyl.

11. A compound of the formula

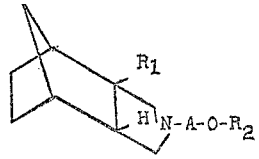

wherein A is lower alkylene, $R_1$ is a member selected from group consisting of hydrogen, lower alkyl and phenyl and $R_2$ is a member selected from the group consisting of lower alkanoyl, benzoyl, hydroxybenzoyl, methylbenzoyl, phenyl-lower alkanoyl and diphenyl-lower alkanoyl.

References Cited in the file of this patent
UNITED STATES PATENTS

| | | |
|---|---|---|
| 2,536,984 | Randall et al. | Jan. 2, 1951 |
| 2,545,283 | Johnson | Mar. 13, 1951 |
| 2,547,495 | Rowland | Apr. 3, 1951 |
| 2,877,234 | Szmuczkovicz | Mar. 10, 1959 |
| 2,890,223 | Woolley et al. | June 9, 1959 |

FOREIGN PATENTS

| | | |
|---|---|---|
| 833,165 | Great Britain | Apr. 21, 1960 |